US012225358B2

(12) United States Patent
Lee et al.

(10) Patent No.: US 12,225,358 B2
(45) Date of Patent: Feb. 11, 2025

(54) DISPLAY CONTROL CIRCUIT FOR CONTROLLING AUDIO/VIDEO AND DISPLAY DEVICE INCLUDING THE SAME

(71) Applicant: LX Semicon Co., Ltd., Daejeon (KR)

(72) Inventors: Do Hoon Lee, Daejeon (KR); Hyun Kyu Jeon, Daejeon (KR); Ji Won Lee, Daejeon (KR); Jae Chan Cho, Daejeon (KR)

(73) Assignee: LX Semicon Co., Ltd., Daejeon (KR)

( * ) Notice: Subject to any disclaimer, the term of this patent is extended or adjusted under 35 U.S.C. 154(b) by 178 days.

(21) Appl. No.: 17/974,184

(22) Filed: Oct. 26, 2022

(65) Prior Publication Data

US 2023/0188916 A1 Jun. 15, 2023

(30) Foreign Application Priority Data

Dec. 14, 2021 (KR) ........................ 10-2021-0178610

(51) Int. Cl.
*H04R 29/00* (2006.01)
*G09G 3/00* (2006.01)
*H04R 5/04* (2006.01)

(52) U.S. Cl.
CPC ........... *H04R 29/002* (2013.01); *G09G 3/002* (2013.01); *H04R 5/04* (2013.01); *G09G 2340/00* (2013.01); *H04R 2499/15* (2013.01)

(58) Field of Classification Search
CPC .... H04R 29/002; H04R 5/04; H04R 2499/15; G09G 3/002; G09G 2340/00
See application file for complete search history.

(56) References Cited

U.S. PATENT DOCUMENTS 8,879,766 B1 * 11/2014 Zhang .................... H04R 1/028 381/406
2014/0314391 A1 10/2014 Kim et al.
2020/0053500 A1 2/2020 Tran
2020/0310736 A1 * 10/2020 Pastrik .................. G06F 1/1605

FOREIGN PATENT DOCUMENTS

KR 20140017684 A 2/2014

* cited by examiner

*Primary Examiner* — Andrew Sniezek
(74) *Attorney, Agent, or Firm* — ROTHWELL, FIGG, ERNST & MANBECK, P.C.

(57) ABSTRACT

The present disclosure relates to a technique for selectively reproducing multiple sounds for respective areas of a display through image analysis for each display area. A technique, for individually controlling multiple audio devices by analyzing an image to extract regions of the image and classifying sound types through data learning, can be provided.

17 Claims, 9 Drawing Sheets

200

110

DISPLAY CONTROL CIRCUIT FOR CONTROLLING AUDIO/VIDEO AND DISPLAY DEVICE INCLUDING THE SAME

CROSS REFERENCE TO RELATED APPLICATION

This application claims priority to Republic of Korea Patent Application No. 10-2021-0178610, filed on Dec. 14, 2021, which is hereby incorporated by reference in its entirety.

BACKGROUND

1. Field of Technology

The present embodiment relates to a display control circuit and a display device including the same.

2. Related Technology

Display devices may include various types of panels such as an organic light emitting diode panel and a liquid crystal display panel and have a data driving circuit, a gate driving circuit, a current supply circuit, and the like for driving pixels arranged in a panel.

The data driving circuit determines a data voltage according to image data and supplies the data voltage to the pixels of the panel through data lines to control the brightness of the pixels. A voltage or current transmitted to light emitting diodes of the pixels is determined according to the magnitude of the data voltage transmitted from the data driving circuit, and accordingly, the brightness of the panel is determined.

A modular display is formed by combining a plurality of display modules and is used for large screens such as indoor and outdoor electric signs and information boards. In a modular display, it is necessary to appropriately control an image or sound for each module according to an input signal.

Conventional display devices provide a single piece of input sound information for one input image or simply provide previously stored sound information and thus cannot provide appropriate audio performance according to changes in image data.

In view of such circumstances, an object of the present embodiment is to provide a display control circuit for realizing stereophonic sound by analyzing an input image in a display device and providing sound corresponding to the image, and a display device including the same.

In addition, an object of the present embodiment is to provide a display control circuit capable of analyzing an input image and input sound in a display including a plurality of audio devices and selectively reproducing or amplifying a sound corresponding to the position of the display, and a display device including the same.

The discussions in this section are only to provide background information and do not constitute an admission of prior art.

SUMMARY

To this end, in one aspect, the present disclosure provides a display control circuit including an image analysis circuit for analyzing features of each region of an input image provided to an audio/video device, a sound analysis circuit for analyzing input sound provided to the audio/video device in a frequency domain and a time domain and generating object sound information, a multi-sound generation circuit for generating multi-sound information by matching the object sound information to the features of each region from the image analysis circuit, and a sound control circuit for individually controlling sound for each area of the audio/video device according to the multi-sound information.

In another aspect, the present disclosure provides a multi-sound reproduction method including an input image analysis step of analyzing features of each region of an image input to an audio/video device using a feature extraction algorithm, an input sound analysis step of analyzing sound input to the audio/video device in a frequency domain and a time domain, a multi-sound generation step of generating multi-sound information by matching the input sound based on an object for each region of the input image, and a sound control step of individually controlling a sound signal of each object based on the multi-sound information.

In another aspect, the present disclosure provides a display device including a panel for displaying an image, an exciter disposed on one surface of the panel to vibrate the panel to generate sound, a data processing circuit for processing image data transmitted to the panel, a display control circuit for processing the image data transmitted to the data processing circuit and sound data transmitted to the exciter, wherein the display control circuit determines an object by analyzing features of each region of image information provided to the panel, analyzes sound information provided to the exciter in a frequency domain and a time domain, and individually controls sound for each area of the panel.

As described above, according to the present embodiment, it is possible to provide a stereophonic sound by reflecting characteristics of an input image supplied to the display device in real time.

In addition, according to the present embodiment, it is possible to analyze an input image and input sound in a display device including a plurality of audio devices, select a sound suitable for each area of the display device, and individually reproduce or amplify the sound.

DETAILED DESCRIPTION OF EMBODIMENTS

Figure 1:
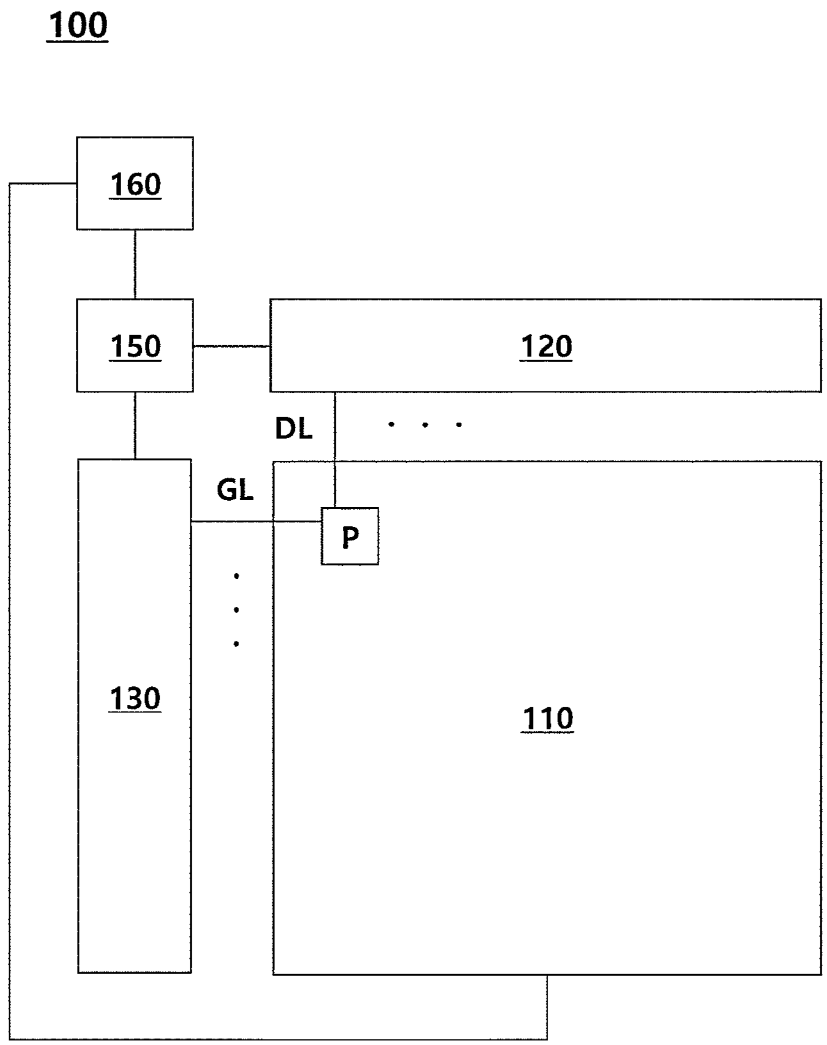
FIG. 1 is a block diagram of a display device according to an embodiment.

FIG. 1 is a block diagram of a display device according to an embodiment.

Referring to FIG. 1, the display device 100 may include a panel 110, a data driving circuit 120, a gate driving circuit 130, a data processing circuit 150, a display control circuit 160, and the like.

The display device 100 is a device capable of providing an image or sound and may be understood as an audio/video (A/V) device or the like. In the display device 100, functions with respect to images and sound may be provided as separate components or may be integrated into one component as needed. For example, the display device 100 may display only an image, reproduce only sound, or simultaneously provide an image and sound.

A plurality of data lines DL, a plurality of gate lines GL, and a plurality of pixels P may be disposed in the panel 110.

The panel 110 may be one or both of a display panel (not shown) and a touch panel (not shown) formed separately or integrally, and various panels such as a liquid crystal display (LCD), an organic light emitting diode (OLED) display panel, a light emitting diode (LED) display panel, and an mini-LED display panel may be used as the panel 110 but the present embodiment is not limited thereto. When the display device 100 is a modular display, the panel 110 may be formed by combining a plurality of panels.

Each of the pixels P disposed in the panel 110 may include one or more light emitting diodes (LEDs) and one or more transistors. The brightness or resolution of the pixel P may be determined by a voltage or current transmitted to the pixel P.

When the panel 110 is a liquid crystal display, a light emitting diode (LED) may be defined as a backlight, and the brightness of the panel 110 may be determined according to the light emitting power of the light emitting diode.

The data driving circuit 120 may supply a data voltage to the pixels P through the data lines DL. The data voltage supplied to the data lines DL may be transferred to the pixels P connected to the data lines DL according to a scan signal of the gate driving circuit 130.

The data driving circuit 120 may transmit an analog signal in the form of a voltage or current to the pixels P and may further include a voltage/current converter (not shown) and the like to change the state of a data voltage or data current and supply the same to LEDs of the pixels P.

The data driving circuit 120 may receive an analog signal (e.g., a voltage, current, or the like) formed in each pixel P through a sensing line SL (not shown) and determine characteristics of each pixel P. In addition, the data driving circuit 120 may sense change in characteristics of each pixel P with time and transmit the same to the data processing circuit 150.

The data driving circuit 120 may take a form of a plurality of driving chips composed of integrated circuits and supplies a voltage to LEDs. For example, the plurality of driving chips may transmit an analog signal to LEDs in the form of a data voltage.

The gate driving circuit 130 may supply a scan signal corresponding to a turn-on voltage or a turn-off voltage to the gate lines GL. When the scan signal corresponding to the turn-on voltage is supplied to a pixel P, the pixel P is connected to a data line DL, and when the scan signal corresponding to the turn-off voltage is supplied to the pixel P, the pixel P is disconnected from the data line DL. The scan signal of the gate driving circuit 130 may define a turn-on timing or a turn-off timing of a transistor of the pixel P.

The data processing circuit 150 may supply various control signals to the data driving circuit 120 and the gate driving circuit 130. The data processing circuit 150 may transmit a data control signal DCS for controlling the data driving circuit 120 to supply a data voltage to each pixel P according to each timing or transmit a gate control signal GCS to the gate driving circuit 130. If necessary, the data processing circuit 150 may be defined as a timing controller T-Con.

The data processing circuit 150 may convert external input data into image data RGB image data to match a data signal format used by the data driving circuit 120 and transmit the image data RGB to the data driving circuit 120.

The data processing circuit 150 may determine an image supply timing of the panel, and the display control circuit 160 may adjust sound output for each area in response to the image supply timing.

The display control circuit 160 may be a circuit for generating image data RGB transmitted to the data processing circuit 150 and may be a circuit for generating sound data transmitted to an audio device (not shown). If necessary, the display control circuit 160 may be implemented in the form of a processor separate from the display device 100 or may be implemented in the form of a component of the data processing circuit 150 according to driving conditions, but is not limited thereto. For example, the display control circuit 160 may be implemented in the form of a system on chip (SoC) of a digital TV, a processor, or the like and serve to control images or sound of the display device 100, but is not limited thereto.

Although the display control circuit 160 may transmit sound data stored in advance by a memory (not shown) to the data processing circuit 150 or the panel 110, the display control circuit 160 may analyze sound information to correspond to images changing in real time and transmit sound data corresponding to images to the data processing circuit 150 or the panel 110.

The display control circuit 160 may determine image data transmitted to the data processing circuit 150 or sound data transmitted to the audio device (not shown), analyze features of each region of image information provided to the panel 110, analyze sound information provided to the audio device (not shown) in a frequency domain and a time domain, and individually adjust sound for each area of the panel 110.

The display control circuit 160 may receive image information and sound information provided in real time and change the output of the audio device (not shown) in response to changes in the image information and the sound information.

Here, adjusting sound for each area of the panel 110 may be understood as controlling sound of the corresponding area of the panel or an audio device (not shown) disposed adjacent thereto.

Although image data transmitted from the display control circuit 160 to the data processing circuit 150 and image data transmitted from the data processing circuit 150 to the data driving circuit 120 may be the same data in FIG. 1, they may be different pieces of data due to data conversion.

Figure 2:
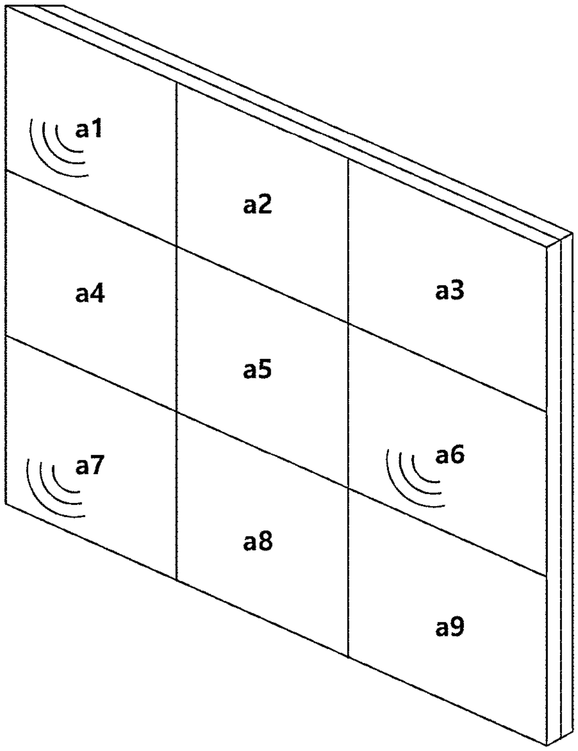
FIG. 2 illustrates a modular display according to an embodiment.

FIG. 2 illustrates a modular display according to an embodiment.

Referring to FIG. 2, the panel 110 may take the form of a modular display but is not limited thereto.

In this case, the panel 110 may be divided into a plurality of areas a1, a2, a3, a4, a5, a6, a7, a8, and a9 and audio devices may be individually controlled for the respective areas.

One or more audio devices may be included in one area, areas a1, a6, and a7 of the panel 110 through which an image will be output may be determined according to characteristics of the image, and the operation of one or more audio devices (not shown) included in each area may be controlled to provide a stereophonic sound.

Position information of an audio device disposed in the panel 110, for example, an exciter, may be stored and calculated in the data processing device 150 or the display control circuit 160 as coordinate information and managed by being integrated with coordinate information of images of the panel 110. Since the actual number of pixels of the panel 110 may be different from the number of audio devices, audio devices which will provide sound information may be selected based on the coordinates of areas through which an image will be output and the edge or center point of an object present in the image.

Figure 3:
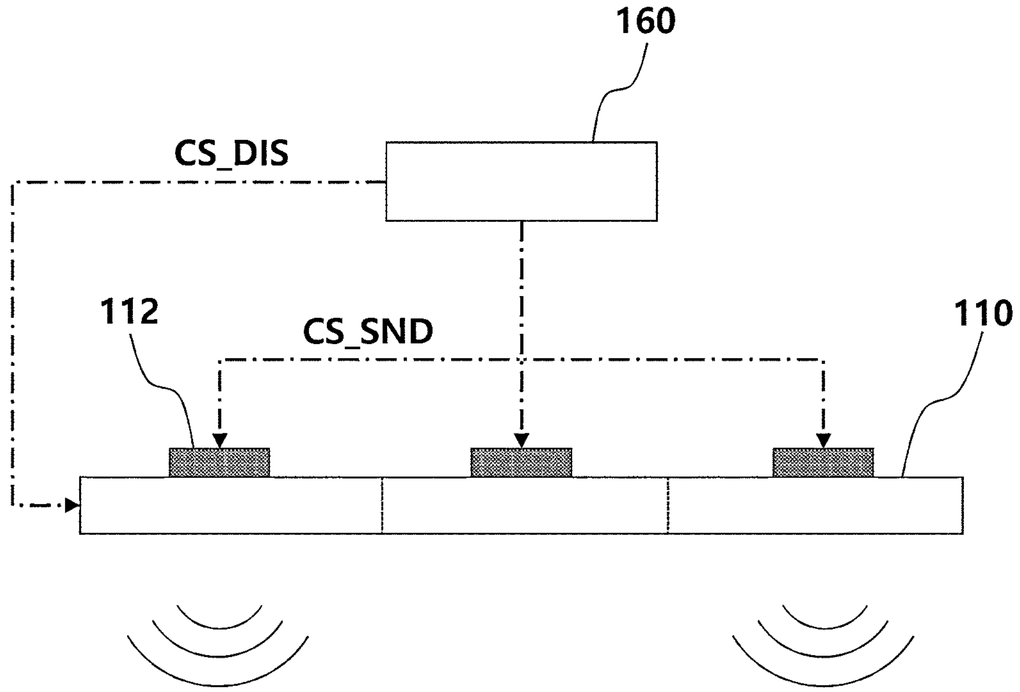
FIG. 3 is a view for describing a sound reproduction process of the modular display according to an embodiment.

FIG. 3 is a view for describing a sound reproduction process of a modular display according to an embodiment.

Referring to FIG. 3, the display control circuit 160 may generate and transmit control signals CS_DIS and CS_SND for controlling images and sounds of the panel 110 and audio devices 112.

The panel 110 may take the form of a modular display and thus can be divided into a plurality of areas, and one or more audio devices 112 may be attached or disposed in each area.

The audio device 112 may be attached to one surface of the panel 110 and transmit sound to a user in a front-oriented manner. A plurality of audio devices 112 may be provided and the operations of the audio devices may be controlled to correspond to an image of the panel 110. For example, the type of sound output by the audio device 112 may be changed in response to the two-dimensional coordinates of an input image.

The audio device 112 may be a device that generates sound according to vibration of an exciter disposed in the panel 110 but is not limited thereto, and any speaker may be used.

The display control circuit 160 may provide or control image information transmitted to the panel 110 or a component of the display device. For example, the display control circuit 160 may generate a signal CS_DIS for determining or controlling image data and a data voltage by reflecting characteristics of an image transmitted to each area of the panel 110 and transmit the same.

In addition, the display control circuit 160 may control power on/off, the intensity of output, output timing, and the like of each audio device 112 according to a sound control signal CS_SND.

FIG. 3 illustrates a method for controlling the panel 110 and the audio devices 112 by the display control circuit 160, and the technical idea of the present embodiment is not limited thereto.

Figure 4:
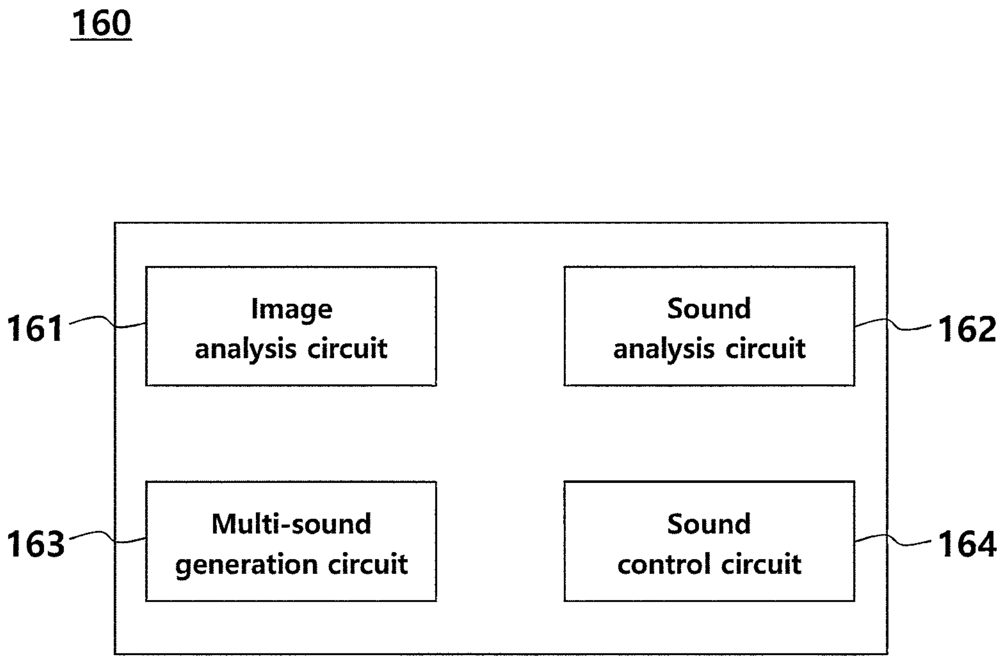
FIG. 4 is a block diagram of a display control circuit according to an embodiment.

FIG. 4 is a block diagram of the display control circuit according to an embodiment.

Referring to FIG. 4, the display control circuit 160 may include an image analysis circuit 161, a sound analysis circuit 162, a multi-sound generation circuit 163, a sound control circuit 164, and the like.

The image analysis circuit 161 may analyze features of respective regions of an input image provided to the display device and determine object types by combining the features of the regions. The image analysis circuit 161 may analyze the features of the input image by categorizing the entire region of the input image based on a certain criterion and extract some regions having features, for example, features of a person distinguished from a background, body features of the person, or the like, from the entire region.

The image analysis circuit 161 may extract features or keypoints of an input image by applying a feature extraction algorithm to the entire region of the input image. For example, the feature extraction algorithm is a feature-based algorithm, and various algorithms such as Pyramid, Scale Invariant Feature Transform (SIFT), Speed Up Robust Features (SURF), and Histogram of Oriented Gradients (HoG) may be adopted to extract keypoints of an object or detect various features of the object.

The image analysis circuit 161 may cluster all or some of extracted keypoints into a cluster and determine a local region composed of the cluster. Although the image analysis circuit 161 may primarily classify objects present in the input image based on the local region, additional analysis for more accurate analysis may be performed. If necessary, a pre-filtering process for removing candidates deviating from a certain criterion among candidates for the keypoints may be performed, and a local region may be determined based on pixels or blocks around the keypoints. In this case, image classification may be performed using a Bag-of-Word method based on local image features determined by keypoints.

The image analysis circuit 161 may set one of local regions as a first region, perform object analysis, and may re-perform object analysis on a region including a second region at a predetermined distance based on coordinate information on the first region. In object analysis in the first region, a feature detection algorithm performed on the entire region may be adopted, and various selection criteria and selection conditions for the second region may be defined. For example, when it is not possible to extract an object feature from the first region, object feature detection may be re-performed based on data included in the first region and the second region. In this case, it is possible to solve the problem that the type of an object cannot be accurately determined due to the lack of information for each region. Even when inaccurate object determination is performed with the first region, the performance of object determination can be improved by detecting a variable region including the second region. Through the above method, even if the entire region is not re-detected, an appropriate amount of information can be obtained and accurate object detection can be performed.

The sound analysis circuit 162 may generate object sound information by analyzing input sound provided to the display device in a frequency domain and a time domain.

The sound analysis circuit 162 may divide the input sound into predetermined sections and extract a frequency component for each section. For example, a method such as short time Fourier transform (STFT) may be utilized for frequency component extraction. In this case, a three-dimensional graph of time, frequency, and input sound intensity may be obtained, and frequency distribution data for each time may be obtained.

The sound analysis circuit 162 may input an extracted sound signal in the frequency domain to an amplifier and determine sound features based on the amplified sound signal. When the intensity of a sound signal is weak or a magnitude difference between sound signals is small, sound features can be more easily detected by amplifying the sound signals. For example, the sensitivity of a high-pitched sound can be amplified using log scale curve mapping.

The sound analysis circuit 162 may determine sound features by converting the extracted sound signal in the frequency domain into a signal in the time domain. In this case, it is possible to obtain change in frequency intensity over time in a specific frequency region as a graph or the like.

The sound analysis circuit 162 may learn the extracted sound signal and classify the same according to object type.

A decision tree, k-nearest neighbors, RCE-Restricted Coulomb Energy Neural Network, or the like may be used as a sound classification method. It is possible to classify features of a sound signal through sound classification in consideration of the frequency domain and the time domain and to determine features of a sound signal according to object type.

The sound analysis circuit 162 may image a sound signal by accumulating frequency components of the sound signal on a time axis in order to classify the sound signal through a convolutional neural network (CNN).

The sound analysis circuit 162 may separate an imaged sound signal data set by learning the same through a convolutional neural network (CNN).

The multi-sound generation circuit 163 may generate multi-sound information by matching sound information to the features of each region obtained through the image analysis circuit 161. In this case, the type of an object is determined for each region and sound information for the same object is transmitted, and thus individual sound control can be performed according to the types of objects transmitted from the entire panel.

The multi-sound generation circuit 163 may obtain multi-sound information by matching position information for each object type obtained by the image analysis circuit 161 to sound information for each sound type obtained by the sound analysis circuit 162.

The sound control circuit 164 may individually control sound for each area of the display device according to the multi-sound information. For example, the sound control circuit 164 may reproduce the sound of a first object located in a first area of the display device and stop reproduction of sound of a second object located in a second area of the display device.

Since the sound control circuit 164 can individually control images and sounds for a plurality of audio devices for a plurality of areas based on the matched multi-sound information, three-dimensional content can be reproduced by reflecting input image information and input sound information transmitted in real time. The sound control circuit 164 may additionally match the position information of the audio devices of the panel 110, position information of objects of an image, and the like and integrate the position information of the audio devices, the image, and position information of sounds to selectively control sounds.

Figure 5:
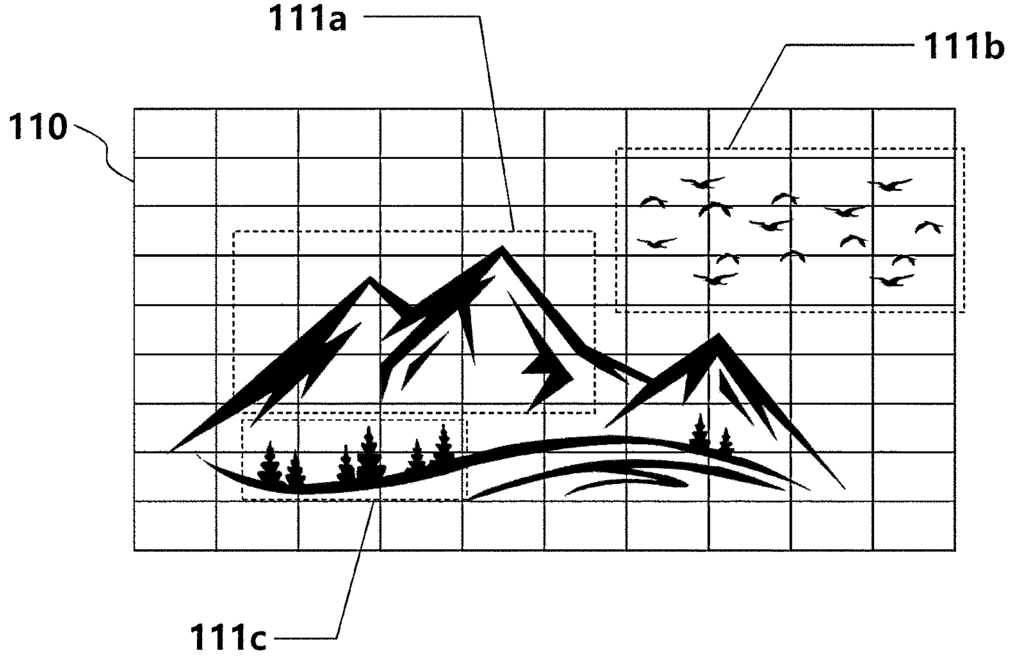
FIG. 5 is a view for describing a method for controlling sound for each area of a display device according to an embodiment.

FIG. 5 is a view for describing a method for controlling sound for each area of the display device according to an embodiment.

Referring to FIG. 5, the panel 110 may be divided into a plurality of areas, and an image may be transmitted to all or some of the areas.

The image transmitted to the panel 110 may be divided into a first local area 111*a*, a second local area 111*b*, and a third local area 111*c*.

Input image data for the entire area of the panel 110 may be analyzed using the above-described feature detection algorithm, and the first to third local areas 111*a*, 111*b*, and 111*c*, which are parts of the entire area, are determined as characteristic keypoints or features.

For example, the first local area 111*a* may be an area representing a snow scene, the second local area 111*b* may be an area representing birds, and the third local area 111*c* may be an area representing a forest.

When the areas have different object types, a sound corresponding to each type may be generated. Stereophonic sound corresponding to each area can be provided in such a manner that a sound of stepping on snow is generated in the first local area 111*a*, a sound of bird chirping is generated in the second local area 111*b*, and a sound of tree shaking is generated in the third local area 111*c*.

Since images changing in real time are transmitted to the panel 110, images and sounds changing in real time can be transmitted based on image analysis results such as image types and the coordinates of the positions of images.

In generation of sound in the panel 110, only the intensity of sound related to a target object from among all sounds may be selectively provided, and the intensity of the selected sound may be individually controlled.

Figure 6:
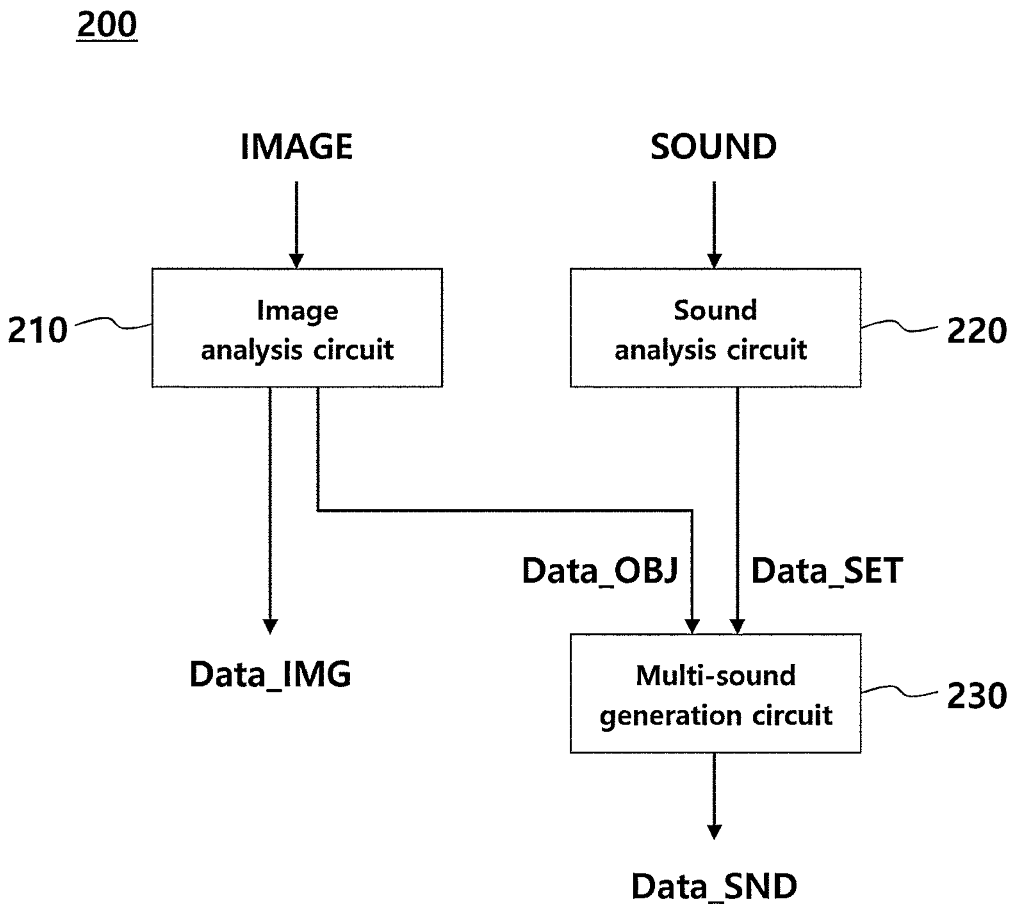
FIG. 6 is a block diagram of a display control circuit according to an embodiment.

FIG. 6 is a block diagram of a display control circuit according to an embodiment.

Referring to FIG. 6, the display control circuit 200 may include an image analysis circuit 210, a sound analysis circuit 220, a multi-sound generation circuit 230, and the like.

The image analysis circuit 210 may generate image data Data_IMG or generate object data Data_OBJ based on an input image IMGAE. The image data Data_IMG may be data transmitted to a panel or a data processing circuit and used to generate a data voltage, and the object data Data_OBJ may be data including information such as the type and position of an object for each area of the panel.

The sound analysis circuit 220 may generate sound set data Data_SET based on input sound SOUND. The sound set data Data_SET may be data classified according to a frequency domain and a time domain.

The multi-sound generation circuit 230 may generate sound data Data_SND using the object data Data_OBJ and the sound set data Data_SET. The sound data Data_SND may be data in which the object data Data_OBJ and the sound set data Data_SET related to the area, position, and object type of an image are combined.

The multi-sound generation circuit 230 may match the sound set data Data_SET from the sound analysis circuit 220 to the object data Data_OBJ that reflects the characteristics of each area from the image analysis circuit 210 to generate multi-sound information and individually control the sound for each area of the panel according to the multi-sound information.

The multi-sound generation circuit 230 may generate multi-sound information by combining coordinate information for each object with coordinate information of an exciter.

Since both the image analysis circuit 210 and the sound analysis circuit 220 are used in the process of generating the sound data (Data_SND), even if image information and sound information change in real time, the change can be updated in real time according to immediate feedback.

In FIG. 6, the sound data Data_SND may be used interchangeably with multi-sound information in the specification.

Figure 7:
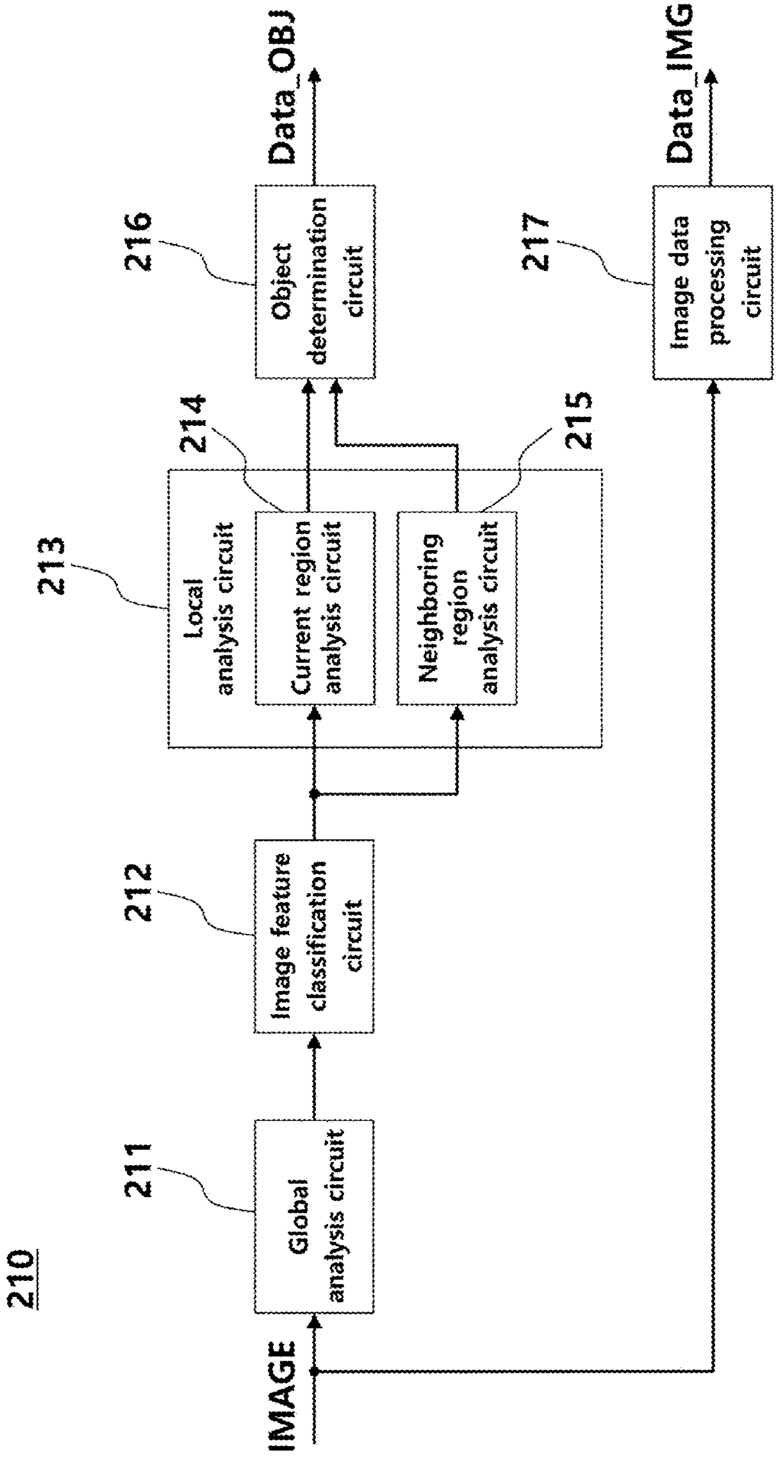
FIG. 7 is a block diagram of an input image analysis circuit according to an embodiment.

FIG. 7 is a block diagram of an input image analysis circuit according to an embodiment.

Referring to FIG. 7, the input image analysis circuit 210 may include a global analysis circuit 211, an image feature classification circuit 212, a local analysis circuit 213, an object determination circuit 216, an image data processing circuit 217, and the like.

The global analysis circuit 211 may be a circuit that selects an entire input image as an image analysis target and primarily analyzes features of the image. When a part of the image is analyzed, data required for feature extraction may be insufficient and thus the entire input image may be selected as an image analysis target.

Although the feature detection algorithm may be executed on the entire input image, for example, all pixels, if necessary, it is possible to reduce the amount of computation by selecting some pixels of the input image, for example, pixels of odd-numbered lines or alternate pixels, and applying the feature detection algorithm thereto, but the present disclosure is not limited thereto.

Convolutional neural network (CNN) learning, feature-based algorithm (FBR), and the like may be used for the feature detection algorithm, but is not limited thereto.

The image feature classification circuit 212 may perform image classification through a Bag-of-Word method based on image features determined by keypoints based on analysis results of the global analysis circuit 211.

The local analysis circuit 213 may verify the result of image classification performed by the image feature classification circuit 212 or re-classify images in detail. If necessary, the local analysis circuit 213 may operate as a backup circuit for acquiring image features when image classification is not completed in the image feature classification circuit 212.

The local analysis circuit 213 may include a current region analysis circuit 214, a neighboring region analysis circuit 215, and the like. The current region analysis circuit 214 may define a region including a target keypoint as a current region and re-execute the above-described feature detection algorithm.

The current region may be a local region formed by clustering all or some of extracted keypoints into a cluster. If necessary, candidates deviating from a predetermined criterion may be removed from candidates for keypoints, and the current region may be determined based on pixels or blocks around the keypoints.

Since keypoint extraction may not be performed smoothly when data of the current region is insufficient, learning data can be additionally secured by defining a neighborhood region. In this case, the number of pieces of data can be increased to improve learning and detection accuracy.

The neighborhood region may be selected in various manners in such a manner that it is selected based on keypoints or the distance from the center of the current region or selected using a set of position coordinates within a preset range. For example, when the current region is a center pixel, a region including 8 adjacent pixels may be defined as a neighboring region by setting a distance to the neighboring region to 1.

The local analysis circuit 213 may extract features in the image by performing image classification based on image information in the current region and the neighboring region.

The object determination circuit 216 may be a circuit that determines the type, shape, position, and the like of an object based on the analysis result of the local analysis circuit 213. The object determination circuit 216 may determine an object based on the analysis result of the current region analysis circuit 214 and apply a weight based on the analysis result of the neighboring region analysis circuit 215 to finally determine the type, shape, and position of the object.

The image data processing circuit 217 may be a circuit that generates image data Data_IMG based on the input image IMAGE and transmits the image data Data_IMG to the panel (not shown) or the data processing circuit (not shown).

Figure 8:
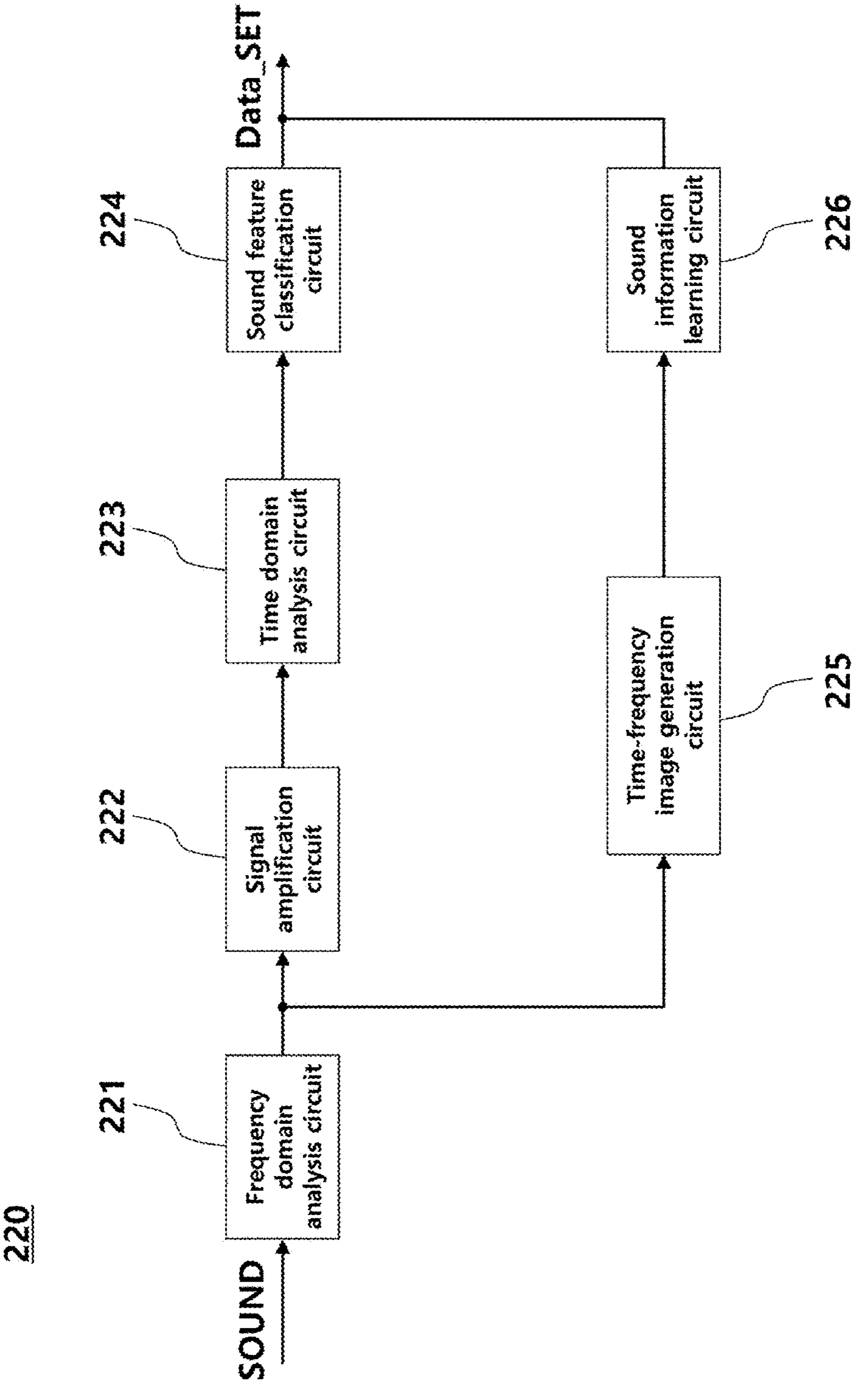
FIG. 8 is a block diagram of an input sound analysis circuit according to an embodiment.

FIG. 8 is a block diagram of an input sound analysis circuit according to an embodiment.

Referring to FIG. 8, the input sound analysis circuit 220 may include a frequency domain analysis circuit 221, a signal amplification circuit 222, a time domain analysis circuit 223, a sound feature classification circuit 224, a time-frequency image generation circuit 225, a sound information learning circuit 226, and the like.

The frequency domain analysis circuit 221 may divide a sound signal into frequency sections and extract a frequency component for each section. For example, a sound signal may be divided into frequency components through Fourier transform, and a specific frequency component may be obtained through a band pass filter or the like.

The signal amplification circuit 222 may adjust the waveform, strength, and the like of a sound signal using an amplifier or the like in order to assist a process of acquiring characteristics of the frequency or time domain of the sound signal. When feature search is performed based on the amplified signal, the speed of feature search can be improved.

The time domain analysis circuit 223 may be a circuit that analyzes change in the sound signal over time.

The sound feature classification circuit 224 may be a circuit that classifies features of sound based on a frequency domain analysis result and a time domain analysis result. When a matching rate of frequency or time and features of preset sounds is high, a sound type may be determined, and the sound type may be determined by applying preset algorithms.

The time-frequency image generation circuit 225 may be a circuit that two-dimensionally image a sound signal in the time domain and the frequency domain in order to apply convolutional neural network (CNN) learning.

The sound information learning circuit 226 may be a circuit that performs convolutional neural network (CNN) learning based on two-dimensional imaged data.

In this case, sound set data Data_SET may be data classified according to the frequency domain and the time domain and may be obtained through the circuits 221, 222, 223, and 224 or through the circuits 221, 225, and 226. By comparing the sound set data Data_SET obtained through the above two routes, it is possible to improve data accuracy or prepare for data loss.

The sound set data Data_SET may be combined with object data Data_OBJ to provide a stereophonic sound to the display device in response to the position and type of an object.

Figure 9:
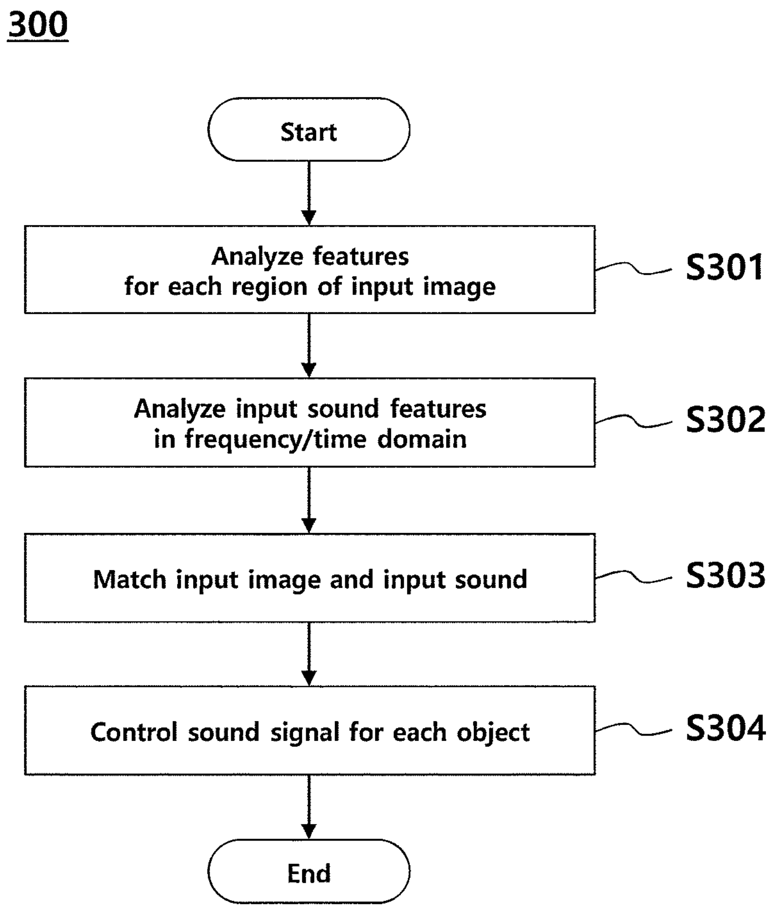
FIG. 9 is a flowchart illustrating a method for controlling a sound signal for each object according to an embodiment.

FIG. 9 is a flowchart illustrating a method for controlling a sound signal for each object according to an embodiment.

Referring to FIG. 9, the method 300 for controlling a sound signal for each object may include an input image analysis step S301, an input sound analysis step S302, a multi-sound generation step S303, and a sound control step S304.

The input image analysis step S301 may be a step of analyzing the features of each region of an image input to the display device using a feature extraction algorithm.

Features of each region of the input image can be obtained when preset conditions are satisfied due to a set of feature points and a set of feature lines, but various learning tools can be utilized.

The input image analysis step S301 may further include a step of performing global analysis for analyzing the entire area of the input image and local analysis for analyzing a region clustered with extracted keypoints. Global analysis may be primarily performed on the entire area of the panel to extract keypoints, and local analysis may be secondarily performed by checking information present at each location.

Although local analysis may be omitted as necessary when global analysis is performed to check features, the analysis steps may be sequentially or repeatedly performed for more accurate feature extraction.

The input sound analysis step S302 may be a step of analyzing sound input to the display device in the frequency domain or the time domain.

In this step, it is possible to analyze physical characteristics such as the waveform and intensity of the input sound based on frequency characteristics or based on change over time.

Although it is possible to primarily perform frequency analysis on the entire input sound signal to extract features and secondarily perform temporal analysis, the order of analysis may be changed.

The input sound analysis step S302 may include a step of aligning frequency components extracted by performing Fourier transform on the input sound, imaging the same, and performing convolutional neural network learning. In this case, in order to improve the accuracy of data analysis, frequency-time may be imaged into a two-dimensional domain and deep learning may be performed.

In this case, it is possible to further perform a step of verifying data accuracy by comparing sequential learning results of the one-dimensional domain with simultaneous learning results of the two-dimensional domain.

According to the above frequency-time analysis, an object type may be determined with respect to a sound signal corresponding to a preset criterion.

The multi-sound generation step S303 may be a step of generating multi-sound information by matching the input sound based on an object for each region of the input image.

Although an object type is determined according to frequency-time analysis in the input sound analysis step S302, the location of an audio device to which the sound signal is transmitted or the location of the panel has not been determined and thus a new data set, for example, multi-sound information, may be obtained by comparing or combining the result of the input sound analysis step S302 with result values of the input image analysis step S301.

The sound control step S304 may be a step of controlling a sound signal with respect to each object based on the multi-sound information.

If image transmission of the panel is continuously changed for individual frames or some frames, the types and positions of objects may be determined in response to change in an input image or input sound over time, and an audio device may be controlled such that it corresponds to the type and position of each respective object.

For example, when the display device includes a plurality of exciters that generate vibrations of diaphragms corresponding to a sound signal, the type of input sound for each region corresponding to an object for each region of the input image may be determined and the position of an exciter may be matched to each region to generate the multi-sound information in the multi-sound generation step S304. The multi-sound information may include position information of the plurality of exciters corresponding to objects and transmit a sound control signal to correspond to the image and sound of an object.

In FIG. 9, the method 300 for controlling a sound signal for each object may be defined as a multi-sound reproduction method, or the like, and some of the steps of FIG. 9 may be omitted or the order of steps may be changed.

What is claimed is:

1. A display control circuit comprising:

an image analysis circuit configured to analyze features of each region of an input image provided to an audio/video device;

a sound analysis circuit configured to analyze input sound provided to the audio/video device in a frequency domain and a time domain and generate object sound information;

a multi-sound generation circuit configured to generate multi-sound information by matching the object sound information to the features of each region from the image analysis circuit; and a sound control circuit configured to individually control sound for each area of the audio/video device according to the multi-sound information, wherein the image analysis circuit is configured to extract keypoints of the image by applying a feature extraction algorithm to an entire region of the input image, and cluster the keypoints and determine local regions comprising clusters to primarily classify objects present in the input image.

2. The display control circuit of claim 1, wherein the image analysis circuit is configured to set one of the local regions as a first region, perform object analysis on the first region, re-perform object analysis on a second region, located at a predetermined distance based on coordinate information on the first region, in addition to the first region and determine object types.

3. The display control circuit of claim 1, wherein the sound analysis circuit is configured to divide the input sound into predetermined sections and perform a Fourier transform for extracting frequency components of the input sound.

4. The display control circuit of claim 3, wherein the sound analysis circuit is configured to input an extracted sound signal in the frequency domain into an amplifier and determine sound features based on an amplified sound signal.

5. The display control circuit of claim 3, wherein the sound analysis circuit is configured to transform an extracted sound signal in the frequency domain into a signal in the time domain to determine sound features.

6. The display control circuit of claim 3, wherein the sound analysis circuit is configured to learn extracted sound signals and classify them according to object types.

7. The display control circuit of claim 1, wherein the multi-sound generation circuit is configured to obtain the multi-sound information by matching position information for each object type acquired by the image analysis circuit and sound information for each object type acquired by the sound analysis circuit.

8. The display control circuit of claim 7, wherein the sound control circuit is configured to reproduce sound of a first object located in a first area of the audio/video device based on the multi-sound information and stop reproduction of sound of a second object located in a second area.

9. A multi-sound reproduction method comprising:

analyzing features of each region of an input image to an audio/video device using a feature extraction algorithm;

analyzing an input sound to the audio/video device in a frequency domain and a time domain;

generating multi-sound information by matching the input sound to an object for each region of the input image; and individually controlling a sound signal of each object based on the multi-sound information, wherein analyzing features of each region of the input image further comprises aligning, in accordance with a time axis, frequency components extracted by performing Fourier transform on the input sound to image the input sound and performing convolutional neural network learning on the imaged input sound.

10. The multi-sound reproduction method of claim 9, wherein the audio/video device comprises a plurality of exciters for generating vibration of a diaphragm corresponding to a sound signal and the multi-sound information includes position information of the plurality of exciters corresponding to objects.

11. The multi-sound reproduction method of claim 10, wherein generating the multi-sound information determines a type of input sound for each region corresponding to an object for each region of the input image and matches a position of an exciter to each region to generate the multi-sound information.

12. The multi-sound reproduction method of claim 9, wherein analyzing features of each region of the input image further comprises performing global analysis for analyzing an entire region of the input image and local analysis for analyzing a region clustered by extracted keypoints.

13. A display device comprising:

a panel configured to display an image;

an exciter disposed on one surface of the panel, the exciter configured to vibrate the panel to generate sound;

a data processing circuit configured to process image data transmitted to the panel; and a display control circuit configured to process the image data transmitted to the data processing circuit and sound data transmitted to the exciter, wherein the display control circuit is configured to determine an object by analyzing features of each region of image information provided to the panel, analyze sound information provided to the exciter in a frequency domain and a time domain, and individually control sound for each area of the panel, wherein the display control circuit is configured to extract keypoints of the image by applying a feature extraction algorithm to an entire region of an input image, and cluster the keypoints and determine local regions comprising clusters to classify objects present in the input image.

14. The display device of claim 13, wherein the display control circuit is configured to generate multi-sound information by matching the sound information from a sound analysis circuit to features of each region from an image analysis circuit and individually control sound for each area of the panel according to the multi-sound information.

15. The display device of claim 14, wherein the multi-sound information is generated by combining coordinate information on each object with coordinate information on the exciter.

16. The display device of claim 13, wherein the data processing circuit is configured to determine an image supply timing of the panel according to the image data provided by the display control circuit and the display control circuit is configured to adjust output of sound for each area according to the image supply timing.

17. The display device of claim 13, wherein the display control circuit is configured to receive the image information and the sound information provided in real time and change output of the exciter in response to changes in the image information and the sound information.

* * * * *